United States Patent
Shi

(10) Patent No.: US 10,489,913 B2
(45) Date of Patent: Nov. 26, 2019

(54) METHODS AND APPARATUSES, AND COMPUTING DEVICES FOR SEGMENTING OBJECT

(71) Applicant: Beijing SenseTime Technology Development Co., Ltd, Beijing (CN)

(72) Inventor: Jianping Shi, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 116 days.

(21) Appl. No.: 15/857,304

(22) Filed: Dec. 28, 2017

(65) Prior Publication Data

US 2018/0144477 A1  May 24, 2018

Related U.S. Application Data

(63) Continuation of application No. PCT/CN2017/088380, filed on Jun. 15, 2017.

(30) Foreign Application Priority Data

Jun. 15, 2016 (CN) .......................... 2016 1 0425391

(51) Int. Cl.
  *G06K 9/34* (2006.01)
  *G06T 7/11* (2017.01)
  (Continued)

(52) U.S. Cl.
  CPC .............. *G06T 7/11* (2017.01); *G06K 9/6267* (2013.01); *G06T 11/60* (2013.01)

(58) Field of Classification Search
  CPC . G06T 2207/20016; G06T 2207/20021; G06T 2207/20081; G06T 2207/20084;
  (Continued)

(56) References Cited

U.S. PATENT DOCUMENTS 8,233,726 B1   7/2012 Popat
8,751,530 B1 * 6/2014 Ioffe ..................... G06F 16/583
                                                707/772
(Continued)

FOREIGN PATENT DOCUMENTS

CN      104077577 A    10/2014
CN      104573744 A     4/2015
(Continued)

OTHER PUBLICATIONS

Wu et al, (Harvesting Discriminative Meta Objects with Deep CNN Features for Scene Classification, 2015 IEEE International Conference on Computer Vision, pp. 1287-1295) (Year: 2015).*

(Continued)

*Primary Examiner* — Amara Abdi
(74) *Attorney, Agent, or Firm* — Syncoda LLC; Feng Ma

(57) ABSTRACT

A method, an apparatus and a computing device for segmenting an object include: selecting, for an image to be processed, multiple local candidate regions according to two or more different preset scales respectively; performing image segmentation processing on two or more local candidate regions, to predict and obtain binary segmentation masks of the two or more local candidate regions; performing image classification processing on the two or more local candidate regions, to predict and obtain object classes to which the two or more local candidate regions belong; and fusing the two or more local candidate regions according to the object class to which the two or more local candidate regions belong and the binary segmentation masks of the two or more local candidate regions, to obtain an object segmentation image.

18 Claims, 13 Drawing Sheets

(51) Int. Cl.
*G06K 9/62* (2006.01)
*G06T 11/60* (2006.01)
(58) Field of Classification Search
CPC . G06T 2207/30261; G06T 11/60; G06T 7/11; G06K 9/3233; G06K 9/6267; G06N 3/0454
See application file for complete search history.

(56) References Cited

U.S. PATENT DOCUMENTS

| | | | | |
|---|---|---|---|---|
| 2010/0066761 | A1* | 3/2010 | Tousch | G06K 9/342 345/629 |
| 2015/0153559 | A1* | 6/2015 | Sato | G02B 21/367 348/79 |

FOREIGN PATENT DOCUMENTS

| | | | | |
|---|---|---|---|---|
| CN | 104992179 | A | 10/2015 | |
| CN | 105469047 | * | 4/2016 | ......... G06K 9/00456 |
| CN | 105469047 | A | 4/2016 | |
| CN | 105488468 | A | 4/2016 | |
| CN | 105488534 | A | 4/2016 | |
| CN | 106097353 | A | 11/2016 | |

OTHER PUBLICATIONS

English Translation of International Search Report in international application No. PCT/CN2017/088380, dated Aug. 28, 2017.

Wu, Ruobinget al., "Harvesting Discriminative Meta Objects with Deep CNN Features for Scene Classification", 2015 IEEE International Conference on Computer Vision,vol.\, No.\, Dec. 31, 2015 (Dec. 31, 2015), ISSN:\, chapters 2.1-2.5 and 3.4.

Arbelaez, P. et al., "Boundary Extraction in Natural Images Using Ultrametric Contour Maps", Proceedings of the 2006 Conference on Computer Vision and Paitern Recognition Workshop (CYPRW' 06), vol.\, No.\, Dec. 31, 2006 (Dec. 31, 2006), ISSN:\, the whole document.

Meng Ning, "The Research of License Plate Characters Recognition Method in Natural Scenes", Software Engineering School of Information Engineering, pp. 1-69, May 2015.

Y. Chen, X. Liu, and M. Yang. Multi-instance object seg- mentation with occlusion handling. In CVPR, pp. 3470-3478, 2015.

J. Dai, K. He, and J. Sun. Convolutional feature masking for joint object and stuff segmentation. In CVPR, pp. 3992-4000, 2015.

R. B. Girshick, J. Donahue, T. Darrell, and J. Malik. Rich feature hierarchies for accurate object detection and semantic segmentation. In CVPR, pp. 580-587, 2014.

B. Hariharan, P. A. Arbela'ez, R. B. Girshick, and J. Malik. Simultaneous detection and segmentation. In ECCV, pp. 297-312, 2014.

B. Hariharan, P. A. Arbela'ez, R. B. Girshick, and J. Malik. Hypercolumns for object segmentation and fine-grained localization. In CVPR, pp. 447-456, 2015.

Z. Liu, X. Li, P. Luo, C. C. Loy, , and X. Tang. Seman-tic image segmentation via deep parsing network. In ICCV, 2015.

J. Long, E Shelhamer, and T. Darrell. Fully convolutional networks for semantic segmentation. In CVPR, pp. 3431-3440, 2015.

S.Ren,K.He,R.Girshick,andJ.Sun.Fasterr-cnn:Toward-s real-time object detection with region proposal networks. NIPS, 2015.

* cited by examiner

METHODS AND APPARATUSES, AND COMPUTING DEVICES FOR SEGMENTING OBJECT

CROSS-REFERENCE TO RELATED APPLICATIONS

This is a continuation application of PCT/CN2017/088380, filed on Jun. 15, 2017, which claims priority to Chinese Patent Application No. CN 201610425391.0, filed on 15 Jun. 2016, entitled "OBJECT SEGMENTING METHODS AND APPARATUSES BASED ON MULTI-LEVEL LOCAL REGION FUSION, AND COMPUTING DEVICES." The disclosures of these applications are incorporated by reference herein in their entirety.

BACKGROUND

Image segmentation is a basic issue in the field of image processing and is widely used in the fields of object identification, robot navigation, scene understanding, and the like.

Different objects in an image may be separated from one another by using an image segmentation technique. Rapidly segmenting the objects in the image and determining boundaries of the objects are critical in image segmentation.

SUMMARY

The present disclosure relates to the technical field of computer vision, and in particular, to methods, apparatuses and computing devices for segmenting an object, and provides an object segmentation solution.

According to an aspect of the present disclosure, a method for segmenting an object is provided, and the method includes:

selecting, for an image to be processed, multiple local candidate regions according to two or more different preset scales respectively;

performing image segmentation processing on two or more local candidate regions, to predict and obtain binary segmentation masks of the two or more local candidate regions;

performing image classification processing on the two or more local candidate regions, to predict and obtain object classes to which the two or more local candidate regions belong respectively; and fusing the two or more local candidate regions according to the object class to which the two or more local candidate regions belong and the binary segmentation masks of the two or more local candidate regions, to obtain an object segmentation image.

According to another aspect of the present disclosure, an apparatus for segmenting an object is provided, and the apparatus includes:

a local candidate region generation module, configured to select, for an image to be processed, multiple local candidate regions according to two or more different preset scales respectively;

an image segmentation module, configured to perform image segmentation processing on two or more local candidate regions, to predict and obtain binary segmentation masks of the two or more local candidate regions;

an image classification module, configured to perform image classification processing on the two or more local candidate regions, to predict and obtain object classes to which the two or more local candidate regions belong; and an image fusion module, configured to fuse the two or more local candidate regions according to the object classes to which the two or more local candidate regions belong and the binary segmentation masks of the two or more local candidate regions, to obtain an object segmentation image.

According to yet another aspect of the present disclosure, a computing device is provided, including: a processor, a communication interface, a memory, and a communication bus; the processor, the communication interface and the memory communicate with one another via the communication bus;

the memory is configured to store at least one instruction for causing the processor to execute the following operations:

selecting, for an image to be processed, multiple local candidate regions according to two or more different preset scales respectively;

performing image segmentation processing on two or more local candidate regions, to predict and obtain binary segmentation masks of the two or more local candidate regions;

performing image classification processing on the two or more local candidate regions, to predict and obtain object classes to which the local candidate regions belong respectively; and fusing the two or more local candidate regions according to the object classes to which the two or more local candidate regions belong and the binary segmentation masks of the two or more local candidate regions, to obtain an object segmentation image.

According to yet another aspect of the present disclosure, an apparatus for segmenting an object is provided, including:

a processor; and a memory for storing instructions executable by the processor;

wherein the processor is configured to:

select, for an image to be processed, a plurality of local candidate regions according to two or more different preset scales respectively;

perform image segmentation processing on two or more local candidate regions, to predict and obtain binary segmentation masks of the two or more local candidate regions;

perform image classification processing on the two or more local candidate regions, to predict and obtain object classes to which the two or more local candidate regions belong respectively; and fuse the two or more local candidate regions according to the object classes to which the two or more local candidate regions belong and the binary segmentation masks of the two or more local candidate regions, to obtain an object segmentation image.

According to yet another aspect of the present disclosure, a non-transitory computer-readable medium is provided for storing computer readable instructions. The instructions include: an instruction for selecting, for an image to be processed, multiple local candidate regions according to two or more different preset scales respectively; an instruction for performing image segmentation processing on two or more local candidate regions, to predict and obtain binary segmentation masks of the local candidate regions; an instruction for performing image classification processing on the two or more local candidate regions, to predict and obtain object classes to which the local candidate regions belong respectively; and an instruction for fusing the two or more local candidate regions according to the object class to which the two or more local candidate regions belong and the binary segmentation masks of the two or more local candidate regions, to obtain an object segmentation image.

The technical solution provided by the present disclosure adopts a multiscale local candidate region generating approach, uses multiscale features of an image, thereby facilitating improving fault-tolerant ability of the object segmentation technique. The present disclosure may segment each of objects while detecting the objects, and determine the precise boundary thereof. The present disclosure uses an effective local region fusion approach after obtaining a segmentation result of the local candidate region by segmenting the local candidate region to facilitate improving the object segmentation effect.

The description above is only a summary of the technical solution of the present disclosure and can be implemented according to the contents of the specification to more clearly understand the technical measures of the present disclosure. Moreover, to make the aforementioned and other purposes, features, and advantages of the present disclosure to be more apparent and understandable, the specific embodiments of the present disclosure are illustrated below.

BRIEF DESCRIPTION OF DRAWINGS

By reading detailed description of the embodiments below, various other advantages and benefits become clear and explicit to persons skilled in the art. The accompanying drawings are merely used for showing the purpose of the embodiments, rather than being considered to be the limitation to the present disclosure. Moreover, in the entire accompanying drawings, a same reference numeral is used for representing a same member.

DETAILED DESCRIPTION

Exemplary embodiments of the present disclosure will be described in more details below with reference to the accompanying drawings. Although the accompanying drawings show the exemplary embodiments of the present disclosure, it should be understood that the present disclosure may be implemented in various forms, and shall not be limited by the embodiments stated herein. On the contrary, providing these embodiments is to help understand the present disclosure more thoroughly, and to completely deliver the scope of the present disclosure to persons skilled in the art.

Figure 1:
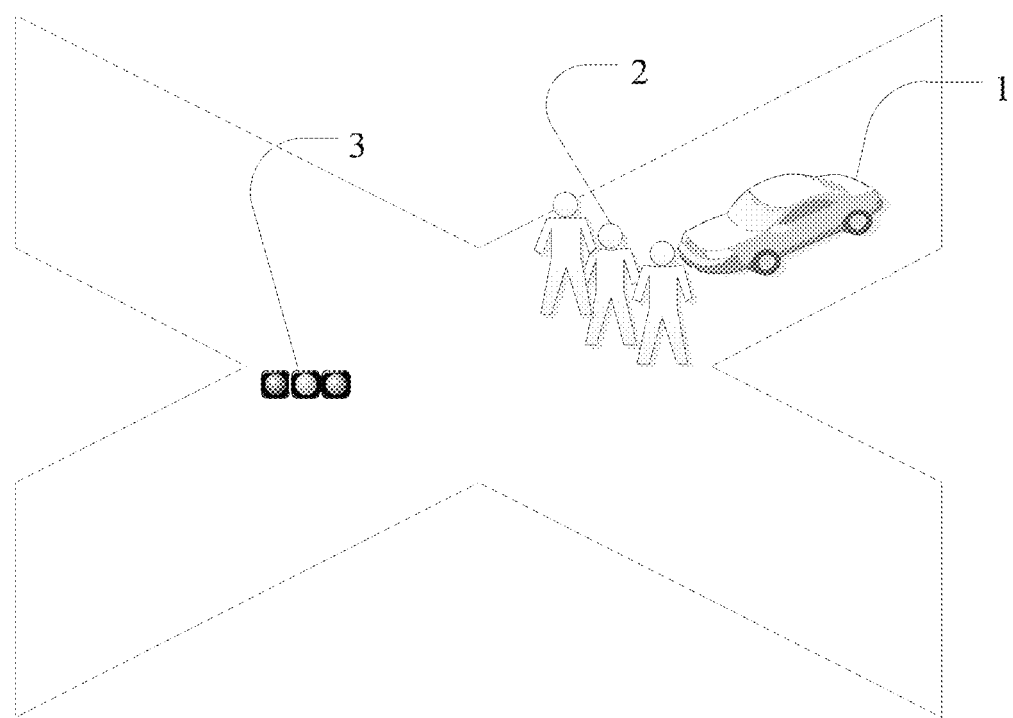
FIG. 1 shows a schematic diagram of an application scene according to an embodiment of the present disclosure.

FIG. 1 exemplarily shows an application scenario in which the present disclosure may be implemented.

In FIG. 1, a driving assistance system is installed in an automobile 1. The driving assistance system in the automobile 1 needs to segment objects, such as a pedestrian 2, a vehicle, and traffic signal lights 3, in a road environment presented by a captured image, to better identify the road environment in the image. For example, in term of image features, several objects that are adjacent to each other on a road seem like a vehicle, however, via object segmentation, the objects that are adjacent to each other may be segmented to accurately identify the objects on the road.

Figure 2:
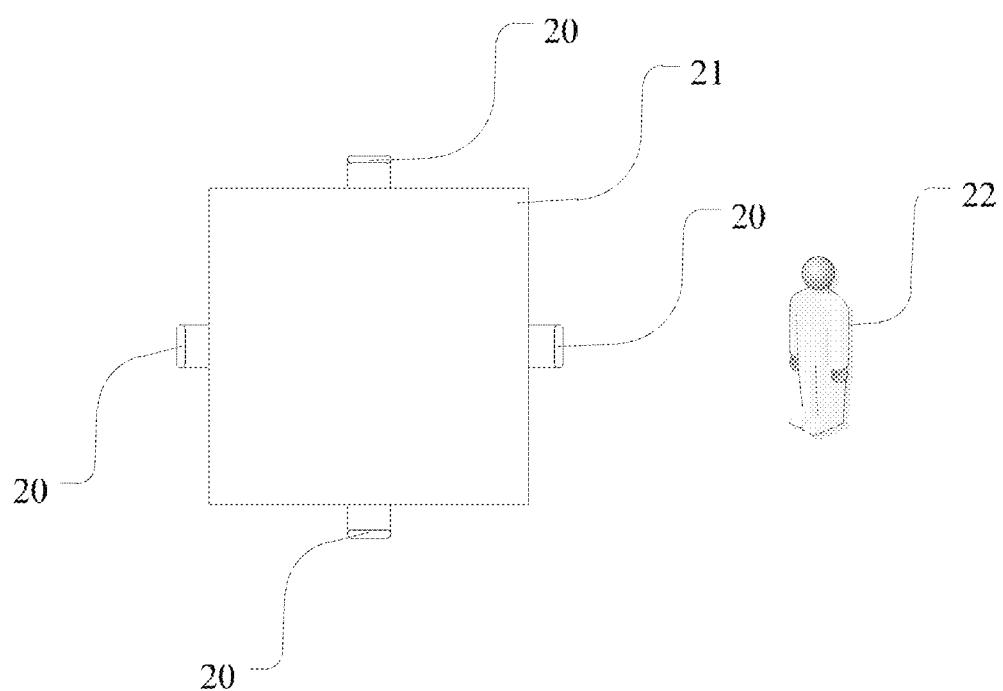
FIG. 2 shows a schematic diagram of another application scene according to an embodiment of the present disclosure.

FIG. 2 exemplarily shows another application scenario in which the present disclosure may be implemented.

In FIG. 2, four chairs 20 surround a square table 21. During a process of fetching one of the chairs 20 or moving the square table 21, a robot 22 needs to perform object segmentation on four chairs 20 and a square table 21 in an image acquired by an image acquiring apparatus thereof, to accurately identify a chair 20 to be fetched or a square table 21 to be moved.

Persons skilled in the art may understand that the present disclosure may also be applicable to other application scenes, that is to say, application scenes to which the present disclosure is applicable are not limited by the above two exemplary application scenes.

The present disclosure provides an object segmentation solution. In the present disclosure, with the object segmentation solution for an image, a method for generating multiscale local candidate regions is used to generate local candidate regions, and multiscale features of the image are fully used, thereby enabling the object segmentation technique of the present disclosure to possess a certain fault-tolerant ability. In the present disclosure, image classification processing is performed on the local candidate regions while performing image segmentation processing on the local candidate regions, thereby realizing segmentation of each of objects in the image while detecting the objects. In the present disclosure, a segmentation result of the local candidate region and an object class to which the local candidate region belong are obtained, and then the segmentation result and the object class is used to fuse the two or more local candidate regions, thus the technical solution of object segmentation based on multilevel local region fusion is formed, and the object segmentation technique of the present disclosure facilitates improving the object segmentation effect.

The object segmentation solution of the present disclosure is introduced in details below through specific embodiments in conjunction with the accompany drawings.

Figure 3:
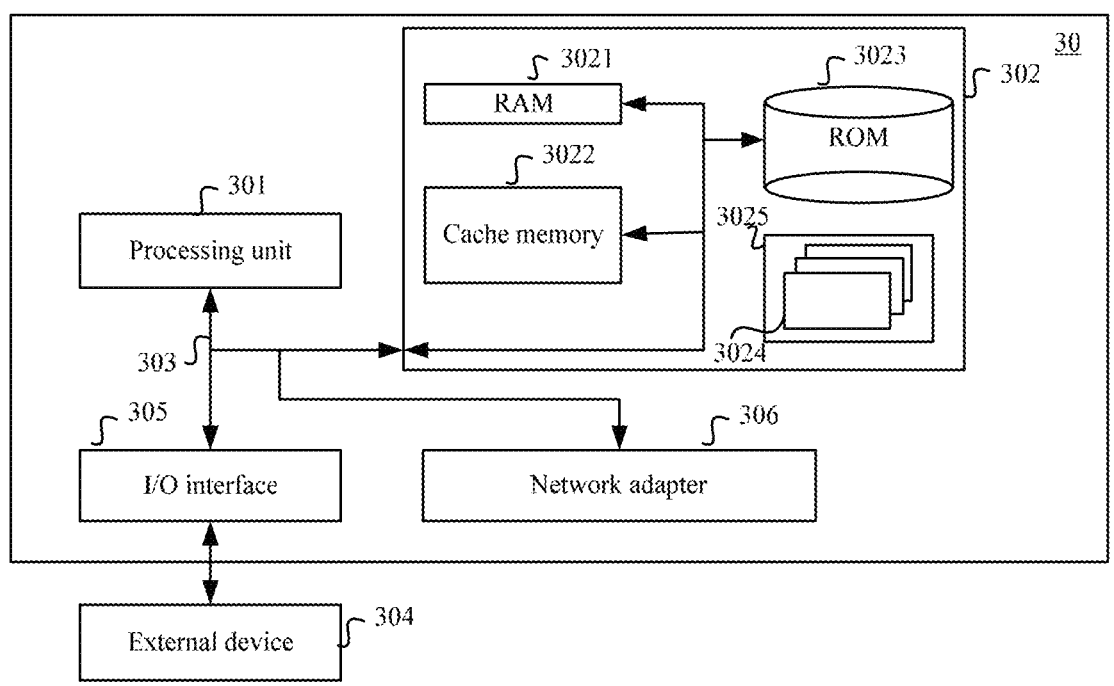
FIG. 3 shows a block diagram for implementing an exemplary device according to an embodiment of the present disclosure.

FIG. 3 shows a block diagram of an exemplary device 30 (for example, a computer system/server) suitable for implementing the present disclosure. The device 30 shown in FIG.

3 is merely an example, and shall not bring any limitation to the functions and usage scopes of the present disclosure.

As shown in FIG. 3, the device 30 may be represented in a form of a universal computing device. Components of the device 30 may include, but not limited to: one or more processing units 301 (i.e., a processor), a system memory 302, and a bus 303 for connecting different system components (including the system memory 302 and the processing unit 301). The device 30 may include multiple computer system readable media. The media may be any available medium accessible by the device 30, including volatile or nonvolatile media, movable or immovable media, etc.

The system memory 302 may include a computer system readable medium in a form of a volatile memory, for example, a random-access memory (RAM) 3021 and/or a cache memory 3022. The device 30 may further include other movable/immovable computer system storage media or volatile/nonvolatile computer system storage media. Only as an example, an ROM 3023 may be used to read or write an immovable and nonvolatile magnetic medium (not shown in FIG. 3, generally referred to as a "hard disk driver"). Although not shown in FIG. 3, the system memory 302 may provide a disc driver for reading and writing a movable and nonvolatile magnetic disc (e.g., a "floppy disk"), and an optical disk driver for reading and writing a movable and nonvolatile optical disk (e.g., CD-ROM, DVD-ROM, or other optical media). Under these circumstances, each driver may be connected to the bus 303 by one or more data medium interfaces. The system memory 302 may include at least one program product having a set of (e.g., at least one) program modules, which are configured to execute the functions of the present disclosure.

A program/utility tool 3025 having a set of (at least one) program modules 3024 may be stored in the system memory 302 for example, and such program modules 3024 include, but not limited to: an operation system, one or more application programs, other program modules and program data, each or a certain combination thereof may be used for implementation of a network environment. The program modules 3024 are generally configured to execute the functions and/or methods described in the present disclosure.

The device 30 may also communicate with one or more external devices 304 (such as a keyboard, a pointing device, a display and/or the like). The communication may be performed via an Input/Output (I/O) interface 305. Moreover, the device 30 may further communicate with one or more networks (such as a Local Area Network (LAN), a Wide Area Network (WAN), and/or a public network such as the Internet) via a network adapter 306. As shown in FIG. 3, the network adapter 306 communicates with other modules (such as the processing unit 301 and the like) of the device 30 via the bus 303. It should be understood that although not shown in FIG. 3, other hardware and/or software modules may be used through the device 30.

The processing unit 301 executes various functional applications and data processing by operating a computer program stored in the system memory 302. For example, the processing unit 301 executes instructions for implementing the steps of the above method. Specifically, the processing unit 301 may execute the computer program stored in the system memory 302, and when the computer program is executed, the following steps are performed: selecting, for an image to be processed, multiple local candidate regions according to two or more different preset scales respectively; performing image segmentation processing on two or more local candidate regions, to predict and obtain binary segmentation masks of the local candidate regions; performing image classification processing on the two or more local candidate regions, to predict and obtain an object classes to which the two or more local candidate regions belong; and fusing the two or more local candidate regions according to the object classes to which the two or more local candidate regions belong and the binary segmentation masks of the two or more local candidate regions, to obtain an object segmentation image.

Figure 4:
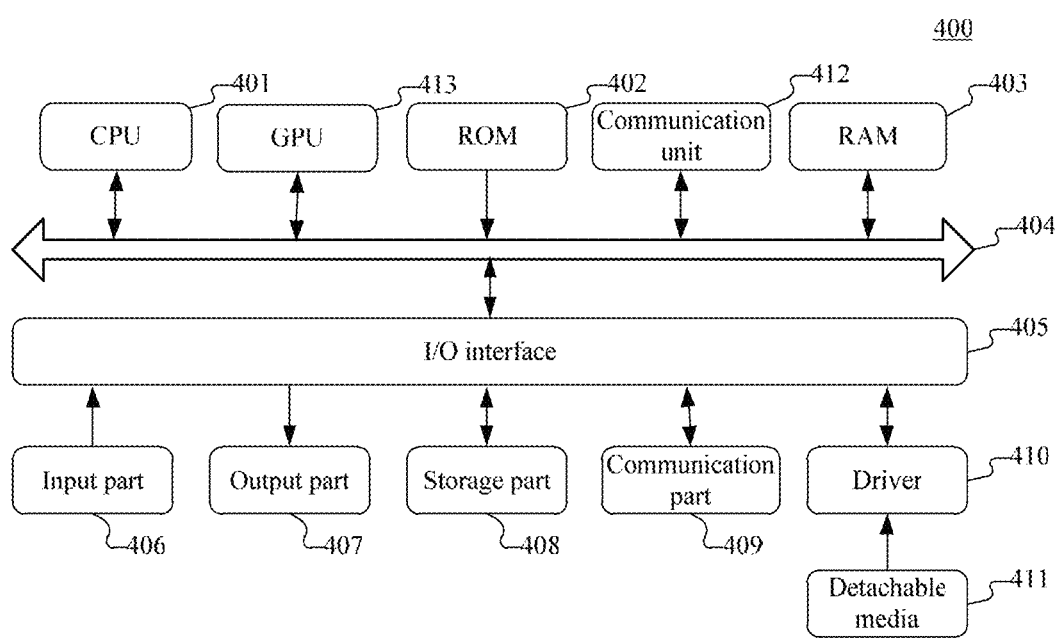
FIG. 4 shows a block diagram for implementing another exemplary device according to an embodiment of the present disclosure.

FIG. 4 shows an exemplary device 400 suitable for implementing the present disclosure. The device 400 may be a mobile terminal, a Personal Computer (PC), a tablet computer, a server and the like. In FIG. 4, the computer system 400 includes one or more processors, a communication unit and the like. The one or more processors may be: one or more central processing units (CPUs) 401, one or more image processors (GPUs) 413 and/or the like. The processor may execute various appropriate actions and processing according to executable instructions stored in a read only memory (ROM) 402 or according to executable instructions loaded into a random-access memory (RAM) 403 from a storage part 408. A communication unit 412 may include, but not limited to, a network card. The network card may include, but not limited to, an IB (Infiniband) network card. The processor may communicate with the read only memory 402 and/or random-access memory 430 to execute the executable instructions. The processor is connected to the communication unit 412 via a bus 404, and communicates with other target devices via the communication unit 412 so as to complete corresponding steps in the present disclosure. In one specific example, the steps executed by the processor include: selecting, for an image to be processed, multiple local candidate regions according to two or more different preset scales respectively; performing image segmentation processing on two or more local candidate regions, to predict and obtain binary segmentation masks of the local candidate regions; performing image classification processing on the two or more local candidate regions, to predict and obtain object classes to which the two or more local candidate regions belong; and fusing the two or more local candidate regions according to the object classes to which the two or more local candidate regions belong and the binary segmentation masks of the two or more local candidate regions, to obtain an object segmentation image.

In addition, various programs and data required during operating an apparatus may further be stored in the RAM 403. The CPU 401, the ROM 402 and the RAM 403 are connected with one another via the bus 404. In the presence of the RAM 403, the ROM 402 is an optional module. The RAM 403 stores executable instructions or writes, into the ROM 402 during operation, the executable instructions, which causes the central processing unit 401 to execute the steps included in the method for segmenting an object. An input/output (I/O) interface 405 is also connected to the bus 404. The communication unit 412 may be configured integrally, or may be configured to have multiple sub-modules (for example, multiple IB network cards) separately connected to the bus.

The following members are connected to the I/O interface 405: an input part 406 including a keyboard, a mouse and the like; an output part 407 including a Cathode-Ray Tube (CRT), a Liquid Crystal Display (LCD), a loudspeaker and the like; a storage part 408 including a hard disk and so on; and a communication part 409 including a network interface card such as a LAN card and a modem, etc. The communication part 409 performs communication processing via a network such as the Internet. The driver 410 is also connected to the I/O interface 405 as required. A detachable medium 411, such as a magnetic disc, an optical disk, a magnetic optical disk, a semiconductor memory and the like, are installed on the driver 410 as required, so that a computer program read therefrom is installed on the storage part 408 as required.

It should be noted that, the framework shown in FIG. 4 is only an optical implementation approach. During a specific practicing process, the number and types of the members in FIG. 4 may be selected, deleted, increased or replaced. Regarding the configuration of different functional members, implementation approaches such as separate configuration or integrated configuration may also be adopted. For example, a GPU may be separated from a CPU. For another example, the GPU may be integrated on the CPU. The communication part may be configured separately, or may be integrated on the CPU or GPU. These alternative embodiments all fall within the protection scope of the present disclosure.

In particular, according to an embodiment of the present disclosure, a process described with reference to a flow chart below may be implemented as a computer software program. For example, the embodiment of the present disclosure includes a computer program product, which includes a computer program tangibly included on a machine readable medium. The computer program includes program codes for executing the steps shown in the flow chart. The program codes may include instructions for correspondingly executing the steps provided in the present disclosure, for example, an instruction for respectively selecting, for an image to be processed, multiple local candidate regions according to two or more different preset scales respectively; an instruction for performing image segmentation processing on two or more local candidate regions, to predict and obtain binary segmentation masks of the local candidate regions; an instruction for performing image classification processing on the two or more local candidate regions, to predict and obtain an object classes to which the two or more local candidate regions belong; and an instruction for fusing the two or more local candidate regions according to the object classes to which the two or more local candidate regions belong and the binary segmentation masks of the two or more local candidate regions, to obtain an object segmentation image.

In such an embodiment, the computer program may be downloaded and installed from the network via the communication part 409, and/or the computer program may be installed from the detachable medium 411. When the computer program is executed by the central processing unit (CPU) 401, the instructions recited in the present disclosure are executed.

The technical solution of object segmentation provided by the present disclosure is explained below in combination with FIGS. 5 to 13.

Figure 5:
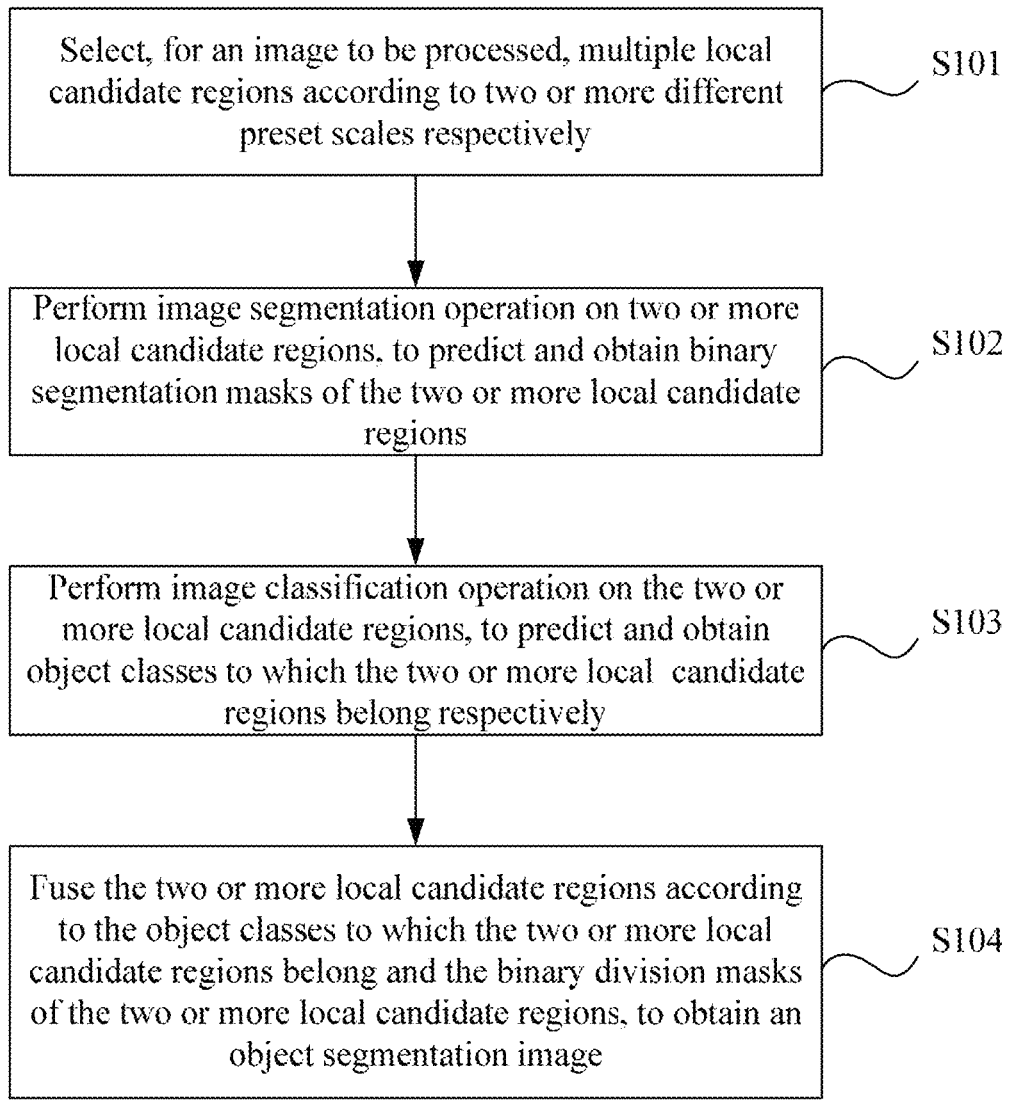
FIG. 5 shows a flow chart of a method for segmenting an object provided in the present disclosure.
Figure 11:
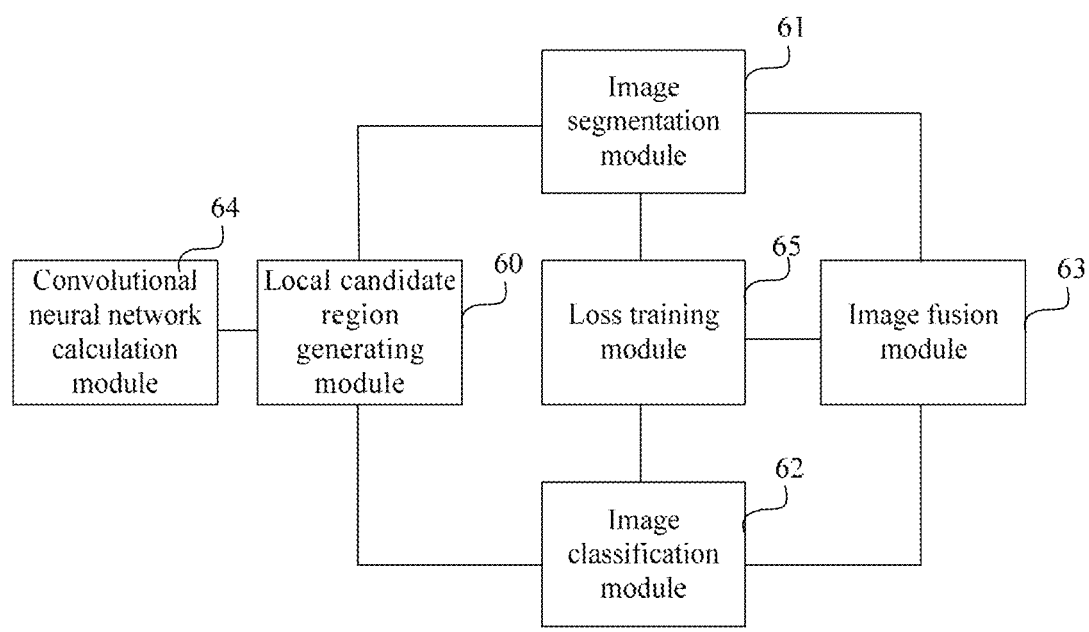
FIG. 11 shows a block diagram of another functional structure of the object segmentation apparatus provided in the present disclosure.

In FIG. 5, in step S101, for an image to be processed, the processor selects multiple local candidate regions according to two or more different preset scales respectively. The step S101 may be executed by a local candidate region generation module 60 shown in FIGS. 10 and 11 operated by the processor, in which, FIG. 10 further shows an image segmentation module 61 an image classification module 62, and an image fusion module 63, which are also shown in FIG. 11.

The present disclosure provides a solution for generating multiscale local candidate regions, in which one object in the image to be processed may be segmented into multiple local candidate regions for study. In the present disclosure, the selected local candidate regions are used as an object for subsequent image segmentation processing and image classification processing.

In step S102, the processor performs image segmentation processing on two or more local candidate regions, to predict and obtain binary segmentation masks of the local candidate regions. The step S102 may be executed by the image segmentation module 61 operated by the processor.

As an example, the processor performs image segmentation processing on each local candidate region by taking the local candidate regions as objects to be input for processing, to predict the binary mask of each local candidate region.

In step S103, the processor performs image classification processing on the two or more local candidate regions, to predict and obtain object classes to which the two or more local candidate regions belong. The step S103 may be executed by the image classification module 62 operated by the processor.

As an example, the processor takes the local candidate regions as objects to be input for processing, and performs image classification processing on each local candidate region to predict the object class to which each local candidate region belongs.

The processor may execute step S102 and step S103 simultaneously or in sequence, the sequence for executing the two steps by the processor is not limited in the present disclosure.

In step S104, the processor fuses the two or more local candidate regions (e.g., all local candidate regions) according to the object class to which the two or more local candidate regions (e.g., all local candidate regions) belong and the binary segmentation masks of the two or more local candidate regions (e.g., all local candidate regions), to obtain an object segmentation image, i.e., obtain an object individual segmentation result. The step S104 may be executed by the image fusion module 63 operated by the processor.

The processor fuses an object local segmentation result and an object local classification result that are obtained from the local candidate regions generated by the solution for generating multiscale local candidate regions to finally obtain the object individual segmentation result of the entire image.

The object segmentation technique provided in the present disclosure uses a method for generating multiscale local candidate regions, and the object segmentation technique is enabled to have a certain fault-tolerant ability by utilizing the multiscale features of the image. The present disclosure can segment each of objects in the image while detecting the objects in the image, and determine the boundaries thereof. In the present disclosure, the local candidate regions are firstly segmented so as to obtain segmentation result of the local candidate regions, and then a local region fusion approach is used to accurately determine the objects in the image.

Figure 6:
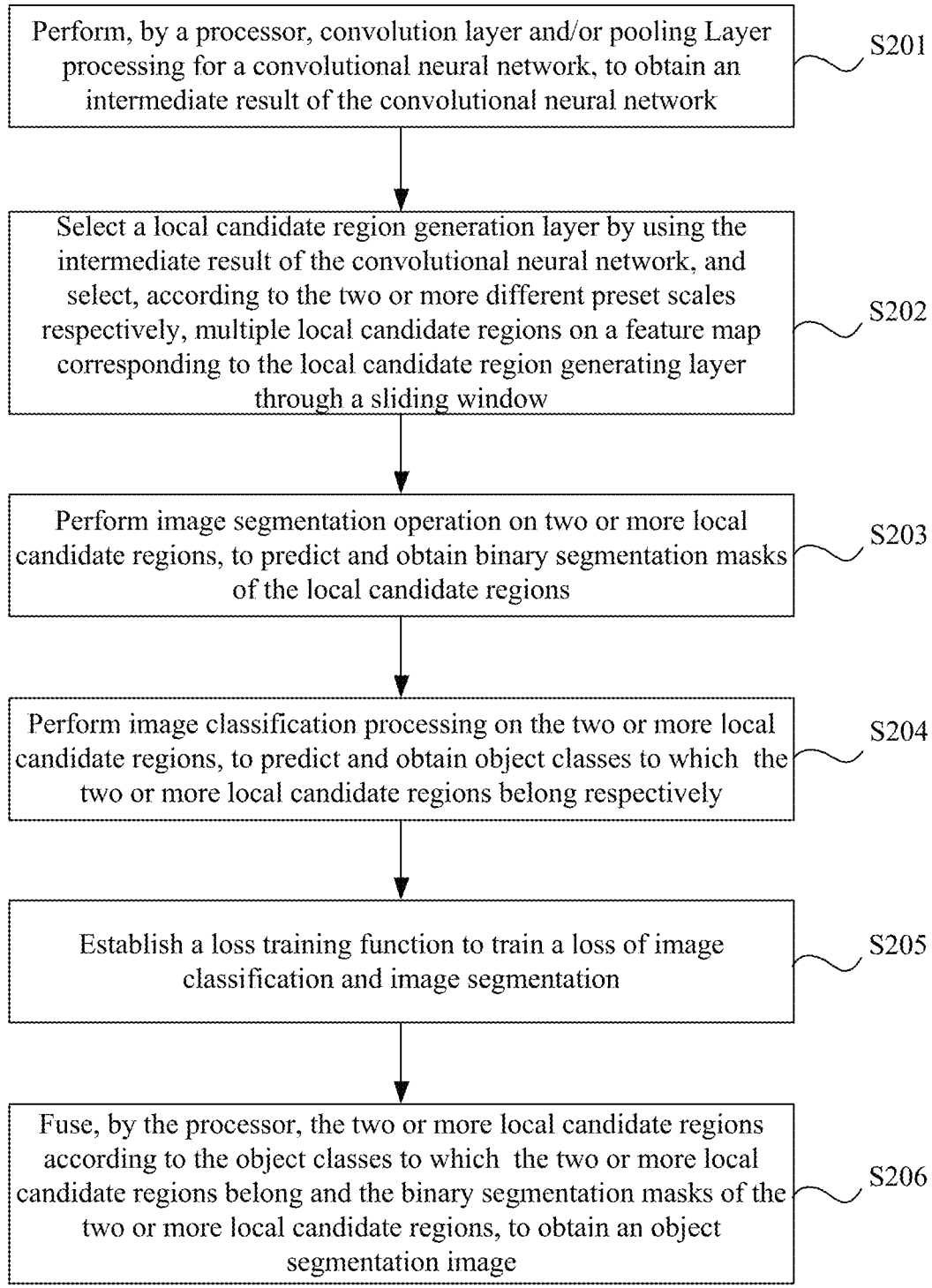
FIG. 6 shows another flow chart of the object segmentation method provided in the present disclosure.
Figure 7:
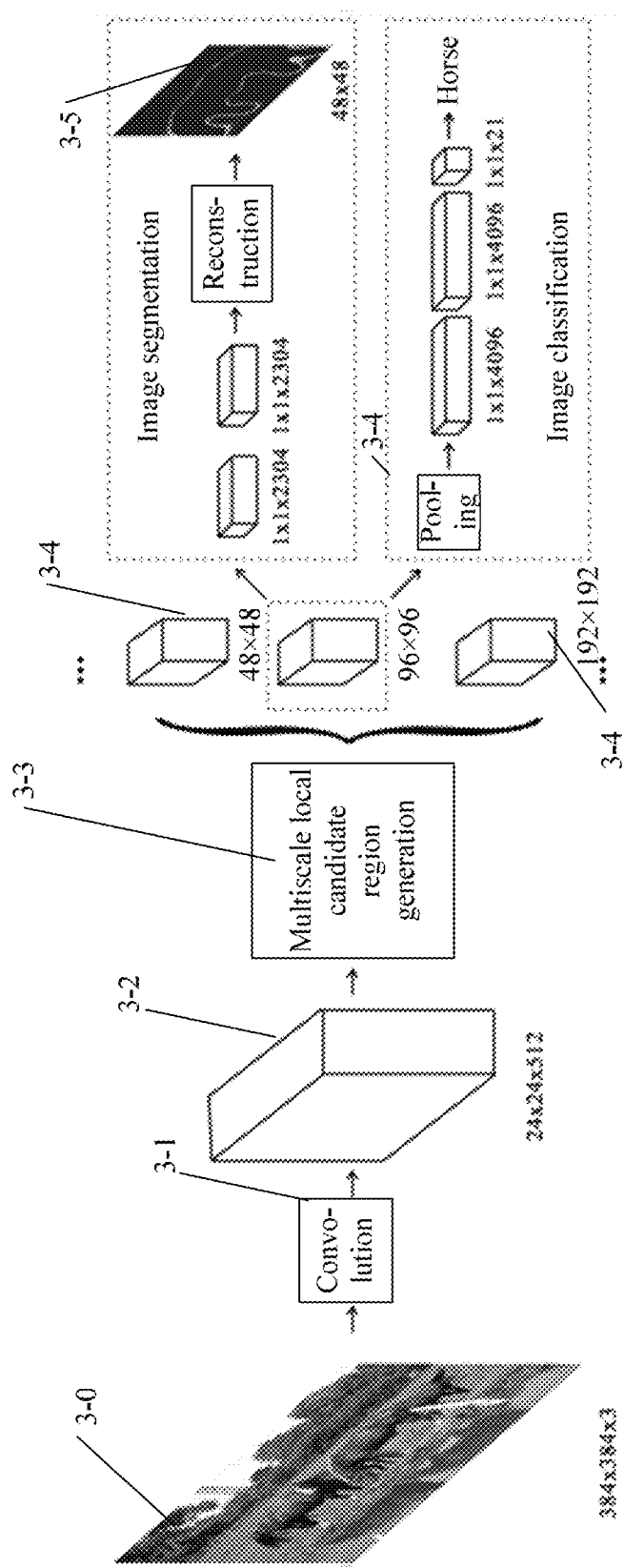
FIG. 7 shows a schematic diagram of a network model of a method for segmenting an object provided in the present disclosure.

In FIGS. 6 and 7, in step S201, the processor performs convolution layer processing 3-1 and/or pooling layer processing, by a convolutional neural network on an image to be processed 3-0, to obtain an intermediate result 3-2 of the convolutional neural network. The step S201 may be executed by a convolutional neural network calculation module 64 in FIG. 11 operated by the processor, in which, FIG. 11 further shows a loss training module 65.

Specifically, the image to be processed 30 may be an image of 384×384×3, where 384×384 represents a size of the image to be processed 3-0, and 3 represents the number of channels (for example, R, G, and B). However, the size of the image to be processed 30 is not limited in the present disclosure.

In the convolutional neural network of the present disclosure, one nonlinear response unit is provided behind some or each of convolutional layers. The nonlinear response unit refers to a Rectified Linear Unit (hereinafter referred to as ReLU). In the present disclosure, the ReLUs is provided behind the convolutional layers such that a mapping result of the convolutional layers is sparse as much as possible to simulate visual reactions of a human, thereby facilitating improving the image processing effect. The present disclosure may configure a convolution kernel of the convolutional layer in the convolutional neural network according to actual situations. For example, in view of facilitating factors such as synthesis of local information and the like, the convolution kernel of the convolutional layer in the convolutional neural network is generally set to be 3×3 in the present disclosure. In addition, the convolution kernel may also be set to be 1×1, 2×2, or 4×4. Meanwhile, in the present disclosure, a step length (stride) of the pooling layer may be set so as to facilitate broadening the vision without increasing a calculation amount of the upper layer feature. Meanwhile, the step length (stride) of the pooling also has a feature for enhancing space invariance, i.e., when a same input appears at different image positions, a same output result response is obtained. The convolutional layer of the convolutional neural network is mainly used to conclude and fuse information. Maximum pooling layer (Max pooling) is mainly used to conclude high-level information. A structure of the convolutional neural network may be fine-tuned to accommodate a tradeoff between different performance and efficiencies.

In a specific example, an intermediate result 3-2 of the convolutional neural network is obtained as follows:

1. input layer
2. <=1 convolutional layer 1_1 (3×3×64)
3. <=2 nonlinear response ReLU layer
4. <=3 convolutional layer 1_2 (3×3×64)
5. <=4 nonlinear response ReLU layer
6. <=5 pooling layer (3×3/2)
7. <=6 convolutional layer 2_1 (3×3×128)
8. <=7 nonlinear response ReLU layer
9. <=8 convolutional layer 2_2 (3×3×128)
10. <=9 nonlinear response ReLU layer
11. <=10 pooling layer (3×3/2)
12. <=11 convolutional layer 3_1 (3×3×256)
13. <=12 nonlinear response ReLU layer
14. <=13 convolutional layer 3_2 (3×3×256)
15. <=14 nonlinear response ReLU layer
16. <=15 convolutional layer 3_3 (3×3×256)
17. <=16 nonlinear response ReLU layer
18. <=17 pooling layer (3×3/2)
19. <=18 convolutional layer 4_1 (3×3×512)
20. <=19 nonlinear response ReLU layer
21. <=20 convolutional layer 4_2 (3×3×512)
22. <=21 nonlinear response ReLU layer
23. <=22 convolutional layer 4_3 (3×3×512)
24. <=23 nonlinear response ReLU layer
25. <=24 pooling layer (3×3/2)
26. <=25 convolutional layer 5_1 (3×3×512)
27. <=26 nonlinear response ReLU layer
28. <=27 convolutional layer 5_2 (3×3×512)
29. <=28 nonlinear response ReLU layer
30. <=29 convolutional layer 5_3 (3×3×512)
31. <=30 nonlinear response ReLU layer A number before a symbol ". <=" is a layer number of a current layer, and a number behind the symbol ". <" is a layer number of an input layer. For example, "2. <=1" indicates that the current layer is the 2nd layer, and the input layer is the 1st layer. Parameters for the convolutional layer are inside a bracket behind "convolutional layer", for example, 3×3×64 indicates that a size of a convolution kernel is 3×3, and the number of channels is 64. Parameters for the pooling layer are inside a bracket behind "pooling layer". For example, 3×3/2 indicates that a size of the pooling kernel is 3×3 and an interval is 2.

In FIG. 7, 24×24×512 indicates a size of an intermediate result 3-2 of the convolutional neural network, and the size of the intermediate result 3-2 of the convolutional neural network varies with a size of the image to be processed 3-0. For example, when the size of the image to be processed 3-0 is increased, the size of the intermediate result 3-2 of the convolutional neural network will also be correspondingly increased.

The intermediate result 3-2 of the convolutional neural network is data used collectively for subsequence image classification processing and image segmentation processing. Using the intermediate result 3-2 of the convolutional neural network may reduce complexity of subsequence processing in a great extent.

In step S202, the processor selects a local candidate region generation layer 3-3 by utilizing the intermediate result 3-2 of the convolutional neural network. The processor selects, according to two or more different preset scales respectively, multiple local candidate regions 3-4 on a feature map corresponding to the local candidate region generation layer 3-3 through a sliding window. The step S202 may be executed by the local candidate region generation module 60 operated by the processor.

The present disclosure segments one object in the image to be processed 3-0 into multiple local candidate regions 3-4 for study. The present disclosure may select four local candidate regions 3-4 with different preset scales, i.e., a local candidate region 3-4 with a preset scale of 48×48 (i.e., a block at the top of the right side of a brace in FIG. 7), a local candidate region 3-4 with a preset scale of 96×96 (i.e., a block at the middle of the right side of the brace in FIG. 7), a local candidate region 3-4 with a preset scale of 192×192 (i.e., a block at the bottom of the right side of the brace in FIG. 7) and a local candidate region with a preset scale of 384×384 (not shown in FIG. 7 due to omission), respectively. The above explanation is merely for illustrating, however, the present disclosure is not limited to the exampled selecting approaches. Selecting multiple different preset scales (for example, 48×48, 96×96, 192×192 and 384×384) facilitates improvement of completeness of the generated local candidate regions.

Based on the intermediate result 3-2 of the convolutional neural network, "32. <=31" is selected as the local candidate region generation layer 3-3. The processor respectively selects the local candidate regions 3-4 according to the multiple different preset scales by controlling the sliding window to slide on the feature map corresponding to the local candidate region generation layer 3-3. In the present disclosure, through the sliding of the sliding window on the feature map, respective feature points in the feature map covered by the sliding window during each sliding form a set of feature points, and feature points included in different sets are not completely identical. The feature map may be a feature map obtained by performing, by the processor, corresponding processing on the image to be processed 3-0, for example, a feature map obtained by performing, by the processor, a convolution calculation on the image to be processed 3-0 using the VGG16 (Visual Geometry Group) network, GoogleNet (Google Network) or ResNet technique.

Each local candidate region $P_i$ ($1 \leq i \leq N$, and N is the number of the local candidate regions) is represented in a form of (r, c, h, w), where (r, c) is the coordinate of a top left corner of the local candidate region 3-4; h and w respectively are a height value and a width value of the local candidate region 3-4. Based on the coordinate of the top left corner of the local candidate region 3-4 as well as the height value and width value of the local candidate region 3-4, a position of the local candidate region 3-4 with respect to the image to be processed 30 may be uniquely determined. The processor may enable the sliding window to slide at a preset stride. For example, the processor controls the sliding window to slide at a stride of 16. On the feature map, each local candidate region $P_i$ corresponds to a down-sampled feature grid $G_i$, $G_i$ may be represented in a form of $$\left(\frac{r}{16}, \frac{c}{16}, \frac{h}{16}, \frac{w}{16}\right).$$

It can be known from the description that, after each sliding of the sliding window on the feature map, one local candidate region 3-4 and one feature grid are formed, and spatial sizes of the feature grid and the local candidate region 3-4 are determined by the sliding window.

To generate the multiscale local candidate regions 3-4 from an input image with a single-scale, the present disclosure uses the collectively used intermediate result 3-2 of the convolutional neural network to select the local candidate regions 3-4 on the feature map corresponding to the selected convolutional layer (the local candidate region generation layer 3-3) with multiple different preset scales respectively, and no computing cost is increased. Moreover, in the present disclosure, since multiple preset scales are selected, objects of different sizes may be covered as many as possible. Each local candidate region 3-4 may cover a part of the objects in the image and does not need to completely contain the objects, and therefore, information learnt from each local candidate region is richer.

Furthermore, since the local candidate regions 3-4 are selected with different preset sizes, the sizes of all the local candidate regions 3-4 are not the same. In the present disclosure, for facilitating subsequence image classification processing and image segmentation processing, the processor in the present disclosure performs deconvolution layer and/or unpooling layer processing to unify the local candidate regions of different sizes to a fixed size. In the above example, there may be multiple spatial sizes for $G_i$, for example, 3×3, 6×6, 12×12, and 24×24, and a deconvolution or unpooling technique is utilized to unify the spatial sizes to be a fixed size, for example, 12×12, 10×10, 11×11, or 13×13. As a specific example, for $G_i$ having spatial sizes of 3×3 and 6×6, the deconvolution technique is adopted for up-sampling processing to make each $G_i$ has a spatial size of 12×12. For $G_i$ having a spatial size of 24×24, the (2×2/2) maximum pooling technique is utilized to make $G_i$ have a spatial size of 12×12.

In step S203, the processor performs image segmentation processing on each local candidate region, to predict and obtain the binary segmentation mask 3-5 of the local candidate region. The step S203 may be executed by the image segmentation module 61 operated by the processor.

In the image segmentation step executed by the processor, $G_i$ is taken as an input and meanwhile the intermediate result 32 of the convolutional neural network is used to perform image segmentation processing on each local candidate region 34, to predict the binary mask $M_i$ of each local candidate region 32.

During a training process, if a center of the local candidate region $P_i$ is located within a certain calibrated object $O_n$, the local candidate region $P_i$ corresponds to the calibrated object $O_n$ in the present embodiment. Hence, it is determined that a binary mask $M_i$ of the local candidate region $P_i$ necessarily should belong to a part of the calibrated object $O_n$. The above-mentioned calibrated object is generally an object that is manually calibrated in advance.

In the above-mentioned example, a process for predicting the binary mask 3-5 (i.e., a binary image consisting of 0 and 1) by the processor is as follows:

33. <=32 convolutional layer seg_6_1 (1×1×2304)
34. <=33 nonlinear response ReLU layer
35. <=34 convolutional layer seg_6_2 (1×1×2304)
36. <=35 reconstruction layer, transforming an input into 48×48
37. <=36 softmax loss layer The 36 and 37 indicate output layers. In addition, in FIG. 7, 1×1×2304 represents a size of a convolution kernel of the convolutional layer involved in the image segmentation process. In FIG. 7, Reconstruction indicates that the local candidate regions, obtained after the respective conventions processed, are rearranged, so as to form a binary mask 3-5 with a size of 48×48.

In step S204, the processor performs image classification processing on each local candidate region, to predict and obtain an object class to which the local candidate region belongs. Step S204 may be executed by the image classification module 62 operated by the processor. The above-mentioned object class may be an object class in an existing data set such as a PASCAL VOC (Pattern Analysis, Statistical modeling and Computational Learning Visual Object Classes) data set, etc.

In the image classification step executed by the processor, $G_i$ is further taken as an input. Meanwhile, the processor uses the intermediate result 3-2 of the convolutional neural network to perform image classification processing on each local candidate region to predict an object class $l_i$ to which the each local candidate region belongs.

In the embodiment, if the local candidate region $P_i$ meets the following three conditions at a same time, it is considered that the local candidate region $P_i$ belongs to the calibrated object $O_n$:

(1) a center of the local candidate region $P_i$ is located within the calibrated object $O_n$; for example, if the calibrated object $O_n$ has an external frame and the center of the local candidate region $P_i$ is located within the external frame of the calibrated object $O_n$, it is determined that the center of the local candidate region $P_i$ is located within the calibrated object $O_n$;

(2) a proportion of an area of the calibrated object $O_n$ in the local candidate region $P_i$ to an area of the calibrated object $O_n$ is greater than a first threshold (50≤the first threshold≤75), for example, greater than 50%; and (3) a proportion of an area of the calibrated object $O_n$ in the local candidate region $P_i$ to an area of the local candidate region $P_i$ is greater than a second threshold (the second threshold is generally smaller than the first threshold, for example, 10≤the second threshold≤20), for example, greater than 20%.

In the above-mentioned example, a process for predicting the class by the processor is as follows:
38. <=32 pooling layer (3×3/2)
39. <=38 convolutional layer cls_6_1 (1×1×4096)
40. <=39 nonlinear response ReLU layer
41. <=40 convolutional layer cls_6_2 (1×1×4096)
42. <=41 nonlinear response ReLU layer
43. <=42 convolutional layer cls_7_1 (1×1×21)
44. <=43 softmax loss layer In FIG. 7, 1×1×4096 and 1×1×21 represent the size of the convolution kernel of the convolutional layer involved in the image classification process.

The processor may execute the step S203 and step S204 simultaneously or in sequence, the sequence for executing the above two steps by the processor is not limited in the present disclosure.

In step S205, the processor trains a loss of the image classification and image segmentation by using a preset loss training function. Step S205 may be executed by the loss training module 65 operated by the processor.

In the present disclosure, for the tasks of image classification and image segmentation, a following loss training function is preset, which enables the processor to determine whether the image classification and image segmentation are accurately combined:

$$L(w) = \sum_i \{f_c(P_i) + \lambda f_s(P_i)\}$$

where W is a network parameter; $f_c(P_i)$ is a classification loss of the local candidate region $P_i$, and corresponds to layer 44 in the above-mentioned example; $f_s(P_i)$ is a loss of the segmentation mask of the local candidate region $P_i$, and corresponds to layer 37 in the above-mentioned example; $\lambda$ is a weight for adjusting $f_c(P_i)$ and $f_s(P_i)$, and can be set as 1; and $1 \leq i \leq N$, where N is the number of the local candidate regions.

The loss training function adopted by the processor of the present disclosure is not limited to the above specific form. By adopting the loss training function in this form, the processor is capable of effectively training the convolutional neural network as shown in FIG. 7 that is designed by the present disclosure.

In step S206, according to the object classes to which the two or more local candidate regions belong and to the binary segmentation masks of the two or more local candidate regions, the processor fuses the two or more local candidate regions to obtain an object segmentation image. Step S206 may be executed by an image fusion module 63 operated by the processor, for example, the image fusion module 63 fuses all local candidate regions 3-4 according to the object classes to which the local candidate regions belong and to the binary segmentation masks 3-5 of the local candidate regions 3-4, so as to obtain an object segmentation image.

Figure 8:
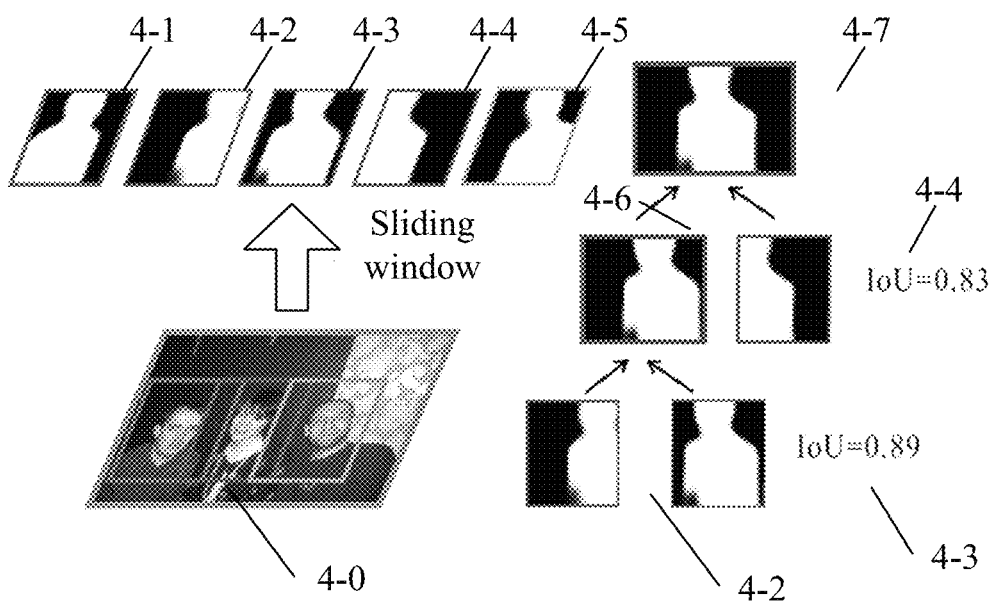
FIG. 8 shows a schematic diagram of an overlapping situation of local candidate regions provided in the present disclosure.

The inventor finds through researches that if an overlapped area between several local candidate regions 3-4 and a certain object meets predetermined requirements (for example, exceeding a preset area threshold), an overlapped area between corresponding binary segmentation masks 3-5 thereof also meets predetermined requirements. FIG. 8 shows a schematic diagram of an overlapping situation of local candidate regions provided by the present disclosure. As shown in FIG. 8, a parameter that reflects an overlapped area of the binary segmentation masks 3-5 of the two local candidate regions 3-4 is defined as IoU (Intersection over Union). The processor uses the sliding window to select several local candidate regions, and the processor determines which local candidate regions shall be assigned as a same object by computing the IoU and the object classes to which the local candidate regions belong, so as to fuse all local candidate regions.

An example for determining whether the overlapped area between the binary segmentation masks meets predetermined requirements is that: the processor obtains binary masks of multiple local candidate regions through the sliding window, i.e., 4-1, 4-2, 4-3, 4-4 and 4-5 in FIG. 8, while three blocks in the image to be processed 4-0 correspond to the corresponding binary masks of the local candidate regions. The processor computes IoU for 4-2 and 4-3, in which, assuming that the computing result is set as IoU=0.89, this IoU meets the predetermined requirements (for example, greater than 0.8), and therefore, the processor may fuse 4-2 and 4-3 into the binary mask 4-6. The processor then computes IoU for 4-6 and 4-4, in which, assuming that the computing result is set as IoU=0.83, this IoU meets the predetermined requirements (for example, also greater than 0.8), and therefore, the processor may fuse 4-6 and 4-4 into the binary mask 4-7, the binary mask 4-7 corresponds to the object segmentation image upon fusion.

The processor in the present disclosure may compute IoU in the following manner: IoU=an intersection area of the binary segmentation masks of the two local candidate regions/(a sum of areas of the binary segmentation masks of the two local candidate regions–an intersection area of the binary segmentation masks of the two local candidate regions).

Furthermore, the operation that the processor (for example, the image fusion module 63 operated by the processor) fuses at least two local candidate regions (for example, all the local candidate regions) includes: determining, by the processor, an overlapped area between binary segmentation masks of two adjacent local candidate regions; and in response to the overlapped area being greater than a preset threshold, the two adjacent local candidate regions belonging to a same object class, and neither of the two adjacent local candidate regions being assigned as an object, the processor generates a new object and assigns the two adjacent local candidate regions as the object.

Furthermore, an operation that the processor (for example, the image fusion module 63 operated by the processor) fuses all of the local candidate regions includes: determining, by the processor, an overlapped area between the binary segmentation masks of two adjacent local candidate regions; and in response to the overlapped area being greater than a preset threshold, the two adjacent local candidate regions belonging to a same object class, and one of the two adjacent local candidate regions being assigned as one object, merging, by the processor, the two adjacent local candidate regions and assigning the other local candidate region as the object.

Furthermore, an operation that the processor (for example, the image fusion module 63 operated by the processor) fuses all of the local candidate regions includes: determining, by the processor, an overlapped area between the binary segmentation masks of two adjacent local candidate regions; and in response to the overlapped area being greater than a preset threshold, the two adjacent local candidate regions belonging to a same object class, and the two adjacent local candidate regions being assigned as two objects, merging, by the processor, the two objects.

Figure 9:
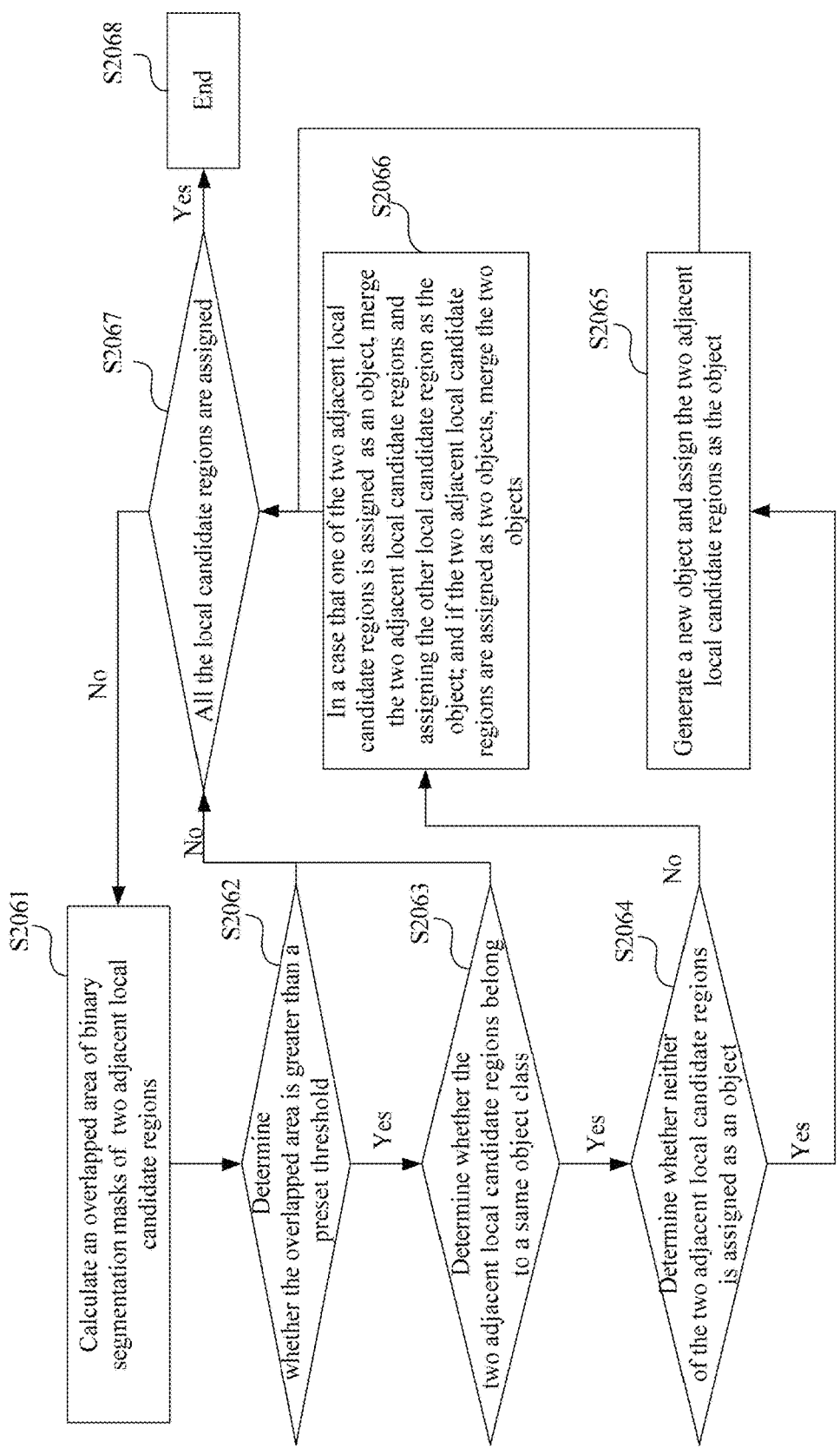
FIG. 9 shows a flow chart for fusing all the local candidate regions provided in the present disclosure.
Figure 10:
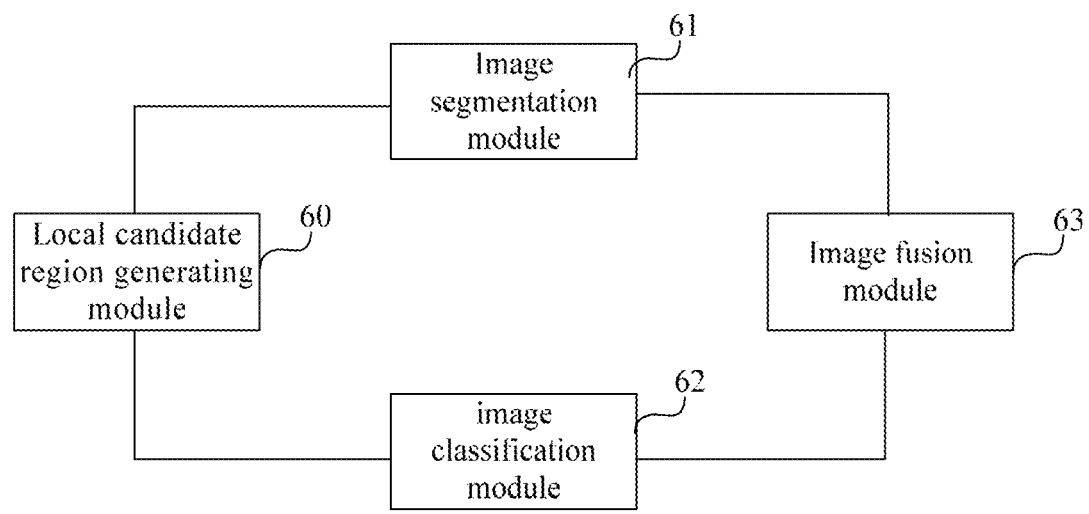
FIG. 10 shows a block diagram of a functional structure of an object segmentation apparatus provided in the present disclosure.

Specifically, FIG. 9 shows a flow chart of fusing all local candidate regions provided by the present disclosure. As shown in FIG. 9, the fusion process executed by the processor (for example, the image fusion module 63 operated by the processor) includes the following steps.

In step S2061, the processor computes an overlapped area of the binary segmentation masks of two adjacent local candidate regions.

The adjacent local candidate regions include adjacent local candidate regions in the row dimension and adjacent local candidate regions in the column dimension. The adjacent local candidate regions in the row dimension generally refer to adjacent local candidate regions in a horizontal direction, and the adjacent local candidate regions in the column dimension generally refer to adjacent local candidate regions in a vertical direction.

In step S2062, the processor determines whether the overlapped area is greater than a preset threshold; if the overlapped area is greater than the preset threshold, the processor executes step S2063; and otherwise, the processor executes step S2067.

In step S2063, the processor determines whether the two adjacent local candidate regions belong to a same object class; if the two adjacent local candidate regions belong to the same object class, the processor executes step S2064; and otherwise, the processor executes step S2067.

In step S2064, the processor determines whether neither of the two adjacent local candidate regions is assigned as an object; if neither of the two adjacent local candidate regions is assigned as the object, the processor executes step S2065; and otherwise, the processor executes step S2066;

In step S2065, the processor generates a new object, and assigns the two adjacent local candidate regions as the object, and the processor executes step S2067.

In step S2066, if one of the two adjacent local candidate regions is assigned as an object, the processor merges the two adjacent local candidate regions, and the processor assigns the other local candidate region as the object; and if the two adjacent local candidate regions are assigned as two objects, the processor merges the two object, and the processor executes step S2067.

In step S2067, the processor determines whether all the local candidate regions are assigned as corresponding objects, and if all the local candidate regions are assigned as corresponding objects, go to step S2068, and the fusion process of the present disclosure ends; and otherwise, the processor continues to execute step S2061, that is, the processor executes steps S2061 to S2066 repeatedly, until all the local candidate regions are assigned as corresponding objects, and a list of all the objects is finally obtained, so that the processor obtains the object segmentation image.

In the present disclosure, local candidate regions for an object are generated. It is possible that one object may be covered by multiple local candidate regions, so that objects of different sizes may be covered. Moreover, each local candidate region may cover a part of the object, but does not need to completely cover the object, so that richer information may be learnt from each local candidate region, thus facilitating improvement of robustness of the object segmentation technique. Meanwhile, by synthesizing the object boundary using multiple local candidate regions, object segmentation results and results of different classifiers can be combined according to the synthesis of the image classification result and image segmentation result of different local candidate regions, thus facilitating improvement of the accuracy of the object segmentation result. The present disclosure can enable a final result to guide the current local candidate region in selecting module by jointly optimizing the local candidate regions, and enable the result to be more accurate. The present disclosure may use unified deep learning to achieve an end-to-end entire object individual segmentation training and test.

The method and display provided herein are not intrinsically associated with any specific computer, virtual system or other devices. Various universal systems may also be used together based on the teaching herein. According to the description above, the structure required for constructing this type of system is obvious. In addition, the present disclosure does not aim at any specific programming language, either. It should be understood that various programming languages may be used to implement the contents described in the present disclosure, and the description of the specific language above is intended to disclose the optimal embodiment of the present disclosure.

In the specification provided herein, a large amount of specific details are illustrated. However, it can be understood that the present disclosure may be practiced without the specific details. In some examples, commonly known methods, structures and techniques are not shown in detail, so as to not obscure the understanding of the specification.

Similarly, it should be understood that, in order to simplify the present disclosure and help understand one or more invention aspects, in the description of the exemplary embodiments of the present disclosure above, the features of the present disclosure sometimes are grouped into a single embodiment, drawing, or description thereof. However, the method of this disclosure should not be illustrated to have the following intention: the claimed present disclosure requires more features than those explicitly recited in each claim. More particularly, as reflected by the claims below, the invention aspects have fewer features than all the features of a single embodiment disclosed above. Hence, the claims complying with the specific embodiment are thus explicitly incorporated into the specific description of the embodiments, and each claim serves as a separate embodiment of the present disclosure.

Persons skilled in the art could understand that self-adaptive changes may be made to the modules in a device in the embodiment and the changed modules may be provided in one or more devices different from the device in the embodiment. The modules or units or components in the present disclosure may be combined into one module or unit or component, and besides, the modules or units or components in the present disclosure may also be segmented into multiple sub-modules or sub-units or sub-components. Except that at least some of such features and/or processes or units are mutually exclusive, all features disclosed in the specification (including the accompanying claims, abstract and drawings) and all processes or units of any method or apparatus disclosed in this way may be combined by employing any combination. Unless otherwise explicitly stated, each feature disclosed in the specification (including accompanying claims, abstract and drawings) may be replaced by an alternative feature that provides identical, equivalent or similar objective.

In addition, persons skilled in the art may understand that although some embodiments include certain features rather than other features included in other embodiments, the combinations of features of different embodiments fall within the scope of the present disclosure and form different embodiments. For example, in the claims below, any one of the claimed embodiments may be used through arbitrary combination.

Each embodiment regarding members in the present disclosure may be implemented with hardware, or may be implemented with a software module operating on one or more processors, or may be implemented with a combination thereof. Persons skilled in the art should understand that a microprocessor or Digital Signal Processor (DSP) may be used in practice to achieve some or all functions of some or all members in the device that obtains application information according to the embodiments of the present disclosure. The present disclosure may also be implemented in a device or apparatus program (for example, a computer program and a computer program product) for executing some or all of the methods described herein. The programs implementing the present disclosure may be stored on a computer readable medium, and may be in the form of having one or more signals. The signals may be obtained by downloading from an Internet website, or provided on a carrier signal, or provided in any other forms.

Figure 12:
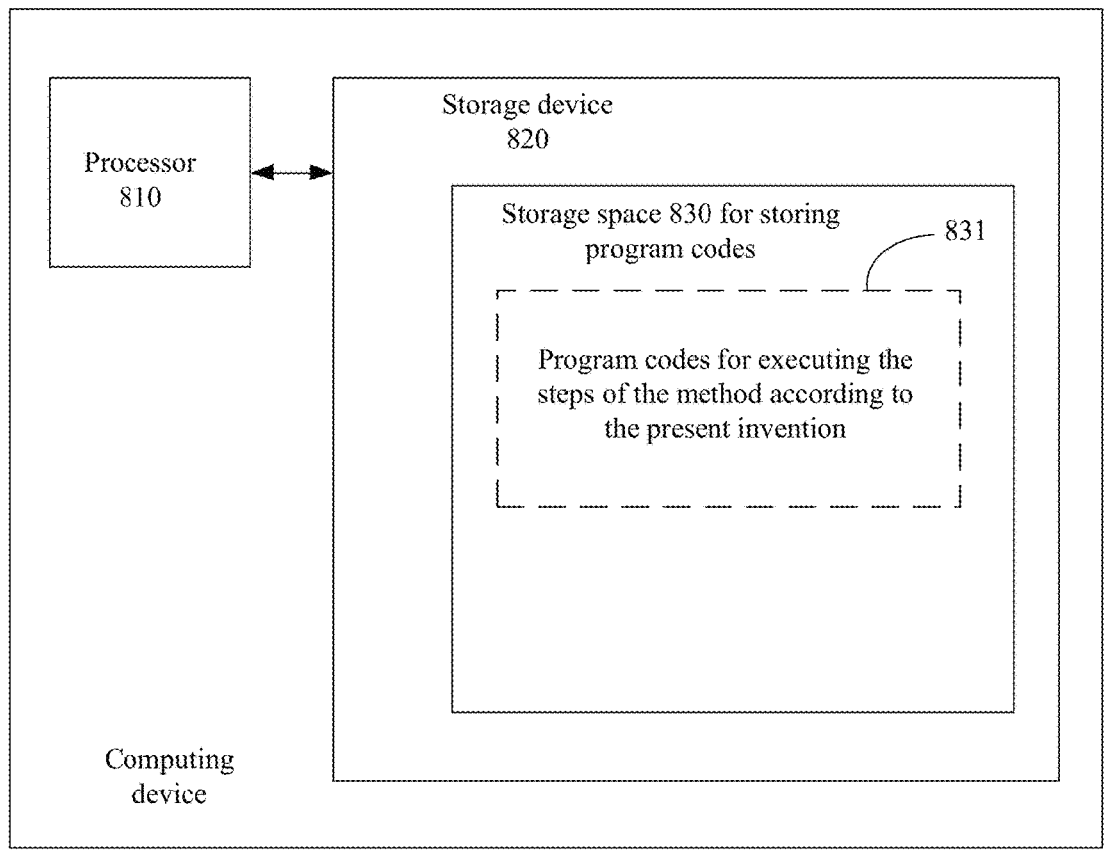
FIG. 12 shows a block diagram of a computing device for executing a method for segmenting an object according to an embodiment of the present disclosure.
Figure 13:
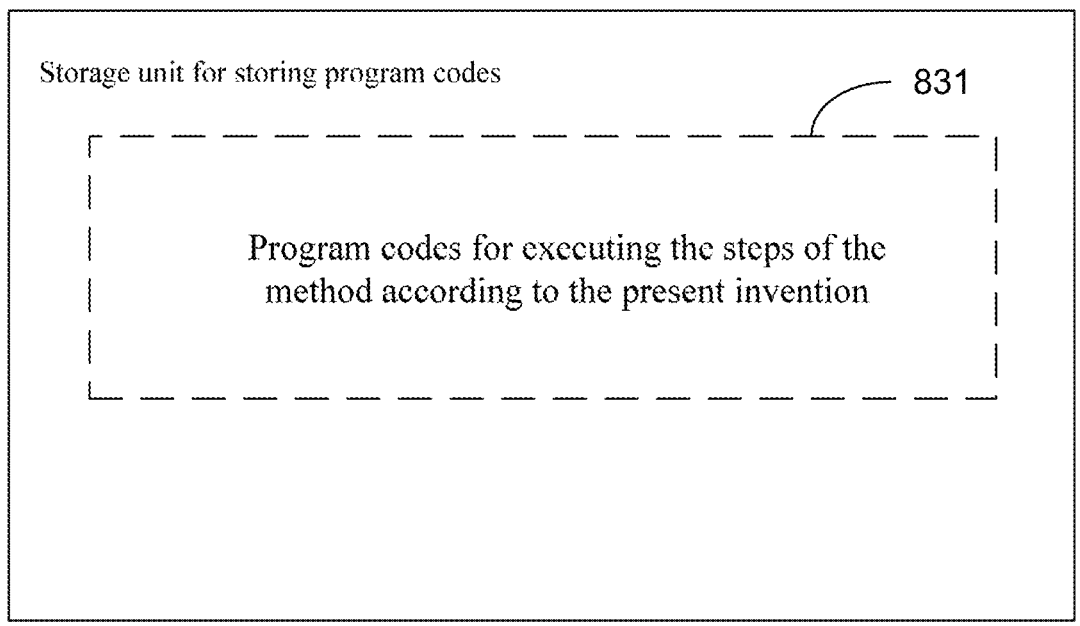
FIG. 13 shows a storage unit for holding or carrying program codes for implementing a method for segmenting an object according to the present disclosure.

For example, FIG. 12 shows a computing device that may implement the object segmentation method in the present disclosure. The computing device conventionally includes a processor 810 and a computer program product or a computer readable medium in a form of a storage device 820. In addition, the computing device further includes a communication interface and a communication bus. The storage device 820 may be, for example, a flash memory, EEPROM (Electrically Erasable Programmable Read-Only Memory), EPROM, hard disk, ROM, or other electronic memories. The processor, the communication interface and the memory communicate with one another via the communication bus. The storage device 820 has a storage space 830 that stores program codes 831 for executing the steps in the method above, and is configured to store at least one instruction for causing the processor to execute various steps in the object segmentation method in the present disclosure. For example, the storage space 830 for storing program codes may include each program code 831 for implementing each step of the method above. These program codes may be read from one or more computer program products or written into the one or more computer program products. These computer program products include a program code carrier such as, for example, a hard disk, a Compact Disk (CD), a memory card, or a floppy disk. Such computer program product generally is a portable or fixed storage unit as shown in FIG. 13, for example. The storage unit may have a storage section, a storage space and the like arranged in a similar way as the storage device 820 in the computing device in FIG. 12. The program code may, for example, be compressed in an appropriate form. Generally, the storage unit includes a computer readable code 831' for executing the steps of the method according to the present disclosure, i.e., code readable by the processor such as 810. When these codes are operated by the computing device, the computing device is caused to execute each step in the method described above.

It should be noted that, the above-mentioned embodiments are used to explain the present disclosure rather than limiting the present disclosure. Moreover, persons skilled in the art may design alternative embodiments without departing from the scope of the appended claims. In the claims, any reference symbol located within a parenthesis should not be constructed as limitation to the claims. The word "comprising" does not exclude components or steps that are not listed in the claims. The word "one" or "a/an" preceding a component does not exclude the existence of multiple such components. The present disclosure may be implemented via hardware including several different components and via a computer that is appropriately programmed. In the claims enumerating several apparatus modules, the several modules in these apparatuses may be specifically embodied using same hardware. The usage of words such as first, second, third and the like does not represent any sequence, and these words may be interpreted as names.

The invention claimed is:

1. A method for segmenting an object, comprising:
   selecting, for an image to be processed, a plurality of local candidate regions according to two or more different preset scales respectively;
   performing image segmentation processing on two or more local candidate regions, to predict and obtain binary segmentation masks of the two or more local candidate regions;
   performing image classification processing on the two or more local candidate regions, to predict and obtain object classes to which the two or more local candidate regions belong respectively; and
   fusing the two or more local candidate regions according to an overlapped area of the binary segmentation masks of the two or more the local candidate regions and the object classes to which the two or more local candidate regions belong, to obtain an object segmentation image.

2. The method according to claim 1, further comprising:
   before the selecting, for an image to be processed, a plurality of local candidate regions according to two or more different preset scales respectively,
   performing convolution layer and/or pooling layer processing by a convolutional neural network, to obtain an intermediate result of the convolutional neural network;
   wherein the selecting a plurality of local candidate regions according to two or more different preset scales respectively further comprises: selecting a local candidate region generation layer by using the intermediate result of the convolutional neural network, and selecting, according to the two or more different preset scales respectively, the plurality of local candidate regions on a feature map corresponding to the local candidate region generation layer through a sliding window.

3. The method according to claim 2, further comprising:
   after selecting the plurality of local candidate regions,
   performing deconvolution layer and/or unpooling layer processing to unify the local candidate regions of different sizes to a fixed size.

4. The method according to claim 1, wherein the performing image classification processing on two or more local candidate regions, to predict and obtain object classes to which the local candidate regions belong further comprises:
   in case that a center of a local candidate region is located within a calibrated object, a proportion of an area of the calibrated object in the local candidate region to an area of the calibrated object is greater than a first threshold, and a proportion of the area of the calibrated object in the local candidate region to an area of the local candidate region is greater than a second threshold, determining, that an object class to which the local candidate region belongs is a class of the calibrated object.

5. The method according to claim 1, further comprising:
   before fusing the two or more local candidate regions,
   establishing a loss training function to train a loss of image classification and image segmentation.

6. The method according to claim 1, wherein fusing the two or more local candidate regions further comprises:
   determining an overlapped area of binary segmentation masks of two adjacent local candidate regions; and
   in response to the overlapped area being greater than a preset threshold, the two adjacent local candidate regions belonging to a same object class, and neither of the two adjacent local candidate regions being assigned as an object, generating a new object and assigning the two adjacent local candidate regions as the new object.

7. The method according to claim 1, wherein fusing the two or more local candidate regions further comprises:
determining an overlapped area of binary segmentation masks of two adjacent local candidate regions; and
in response to the overlapped area being greater than a preset threshold, the two adjacent local candidate regions belonging to a same object class, and one of the two adjacent local candidate regions being assigned as an object, merging the two adjacent local candidate regions and assigning the other local candidate region as the object.

8. The method according to claim 1, wherein fusing the two or more local candidate regions further comprises:
determining an overlapped area of binary segmentation masks of two adjacent local candidate regions; and
in response to the overlapped area being greater than a preset threshold, the two adjacent local candidate regions belonging to a same object class, and the two adjacent local candidate regions being assigned as two objects, merging the two objects.

9. An apparatus for segmenting an object, comprising:
a processor; and
a memory for storing instructions executable by the processor;
wherein the processor is configured to:
select, for an image to be processed, a plurality of local candidate regions according to two or more different preset scales respectively;
perform image segmentation processing on two or more local candidate regions, to predict and obtain binary segmentation masks of the two or more local candidate regions;
perform image classification processing on the two or more local candidate regions, to predict and obtain object classes to which the two or more local candidate regions belong respectively; and
fuse the two or more local candidate regions according to an overlapped area of the binary segmentation masks of the two or more the local candidate regions and the object classes to which the two or more local candidate regions belong, to obtain an object segmentation image.

10. The apparatus according to claim 9, the processor is further configured to perform convolution layer and/or pooling layer processing by a convolutional neural network, to obtain an intermediate result of the convolutional neural network; and
the processor is further configured to: select a local candidate region generation layer by using the intermediate result of the convolutional neural network, and select, according to the two or more different preset scales respectively, the plurality of local candidate regions on a feature map corresponding to the local candidate region generation layer according to the two or more different preset scales through a sliding window.

11. The apparatus according to claim 10, wherein the processor is further configured to: perform deconvolution layer and/or unpooling layer processing to unify the local candidate regions in different sizes to a fixed size.

12. The apparatus according to claim 9, wherein the processor is further configured to: determine that an object class to which the local candidate region belongs is a class of the calibrated object, in case that a center of a local candidate region is located within a calibrated object, a proportion of an area of the calibrated object in the local candidate region to an area of the calibrated object is greater than a first threshold, and a proportion of the area of the calibrated object in the local candidate region to an area of the local candidate region is greater than a second threshold.

13. The apparatus according to claim 9, the processor is further configured to establish a loss training function to train a loss of image classification and image segmentation.

14. The apparatus according to claim 9, wherein the processor is further configured to:
determine an overlapped area of binary segmentation masks of two adjacent local candidate regions; and
in response to the overlapped area being greater than the preset threshold, the two adjacent local candidate regions belonging to a same object class, and neither of the two adjacent local candidate regions being assigned as an object, generate a new object and assign the two adjacent local candidate regions as the new object.

15. The apparatus according to claim 9, wherein the processor is further configured to:
determine an overlapped area of binary segmentation masks of two adjacent local candidate regions; and
in response to the overlapped area being greater than the preset threshold, the two adjacent local candidate regions belonging to the same object class, and one of the two adjacent local candidate regions being evaluated as an object, merge the two adjacent local candidate regions and evaluate the other local candidate region as the object,
in response to the overlapped area being greater than a preset threshold, the two adjacent local candidate regions belonging to a same object class, and one of the two adjacent local candidate regions being assigned as an object, merge the two adjacent local candidate regions and assign the other local candidate region as the object.

16. The apparatus according to claim 9, wherein the processor is further configured to:
determine an overlapped area of binary segmentation masks of two adjacent local candidate regions; and
in response to the overlapped area being greater than a preset threshold, the two adjacent local candidate regions belonging to a same object class, and the two adjacent local candidate regions being assigned as two objects, merge the two objects.

17. A non-transitory computer-readable medium having stored therein instructions that, when executed by a processor, causes to the processor to:
select, for an image to be processed, a plurality of local candidate regions according to two or more different preset scales respectively;
perform image segmentation processing on two or more local candidate regions, to predict and obtain binary segmentation masks of the two or more local candidate regions;
perform image classification processing on the two or more local candidate regions, to predict and obtain object classes to which the two or more local candidate regions belong respectively; and
fuse the two or more local candidate regions according to an overlapped area of the binary segmentation masks of the two or more the local candidate regions and the object classes to which the two or more local candidate regions belong, to obtain an object segmentation image.

18. A program product comprising non-transitory computer readable instructions that cause a processor to execute the method of claim 1.

\* \* \* \* \*